March 1, 1927.
J. J. COFFEY
MILLING MACHINE
Filed March 29, 1922    3 Sheets-Sheet 1
1,619,057
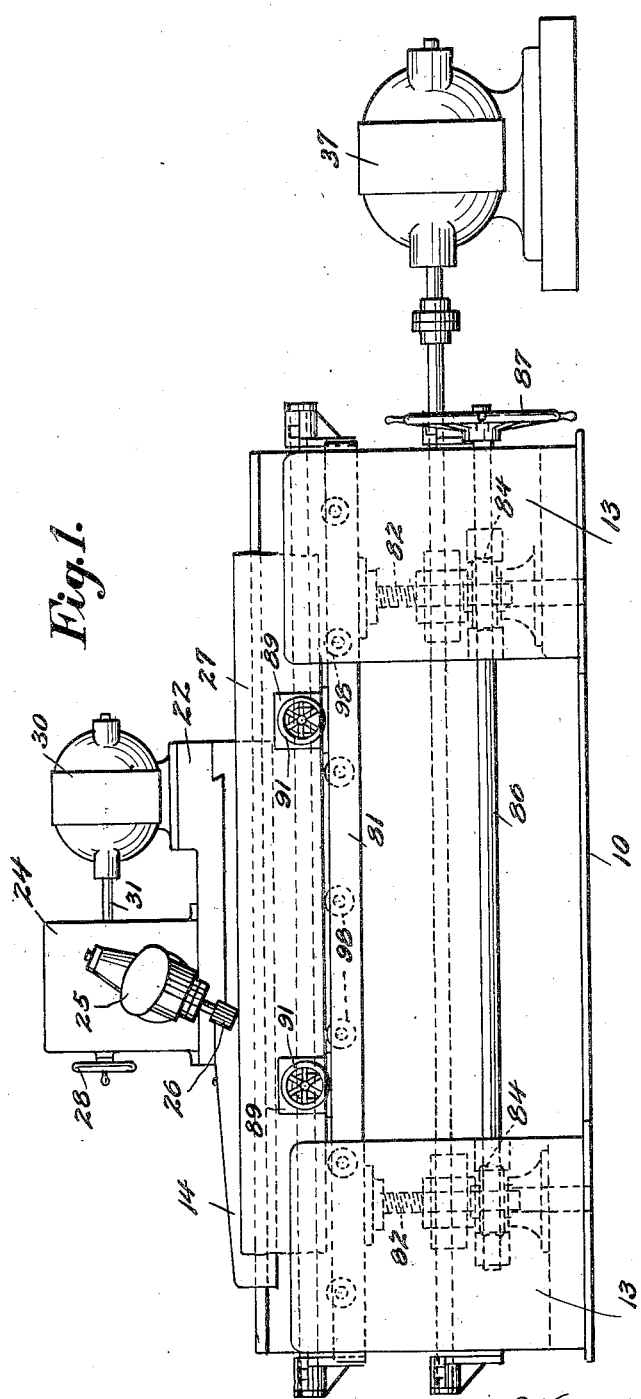
Inventor
J. J. Coffey,
By Watson, Coit, Morse & Grindle,
Att'ys March 1, 1927. 1,619,057
J. J. COFFEY
MILLING MACHINE
Filed March 29, 1922 3 Sheets-Sheet 2
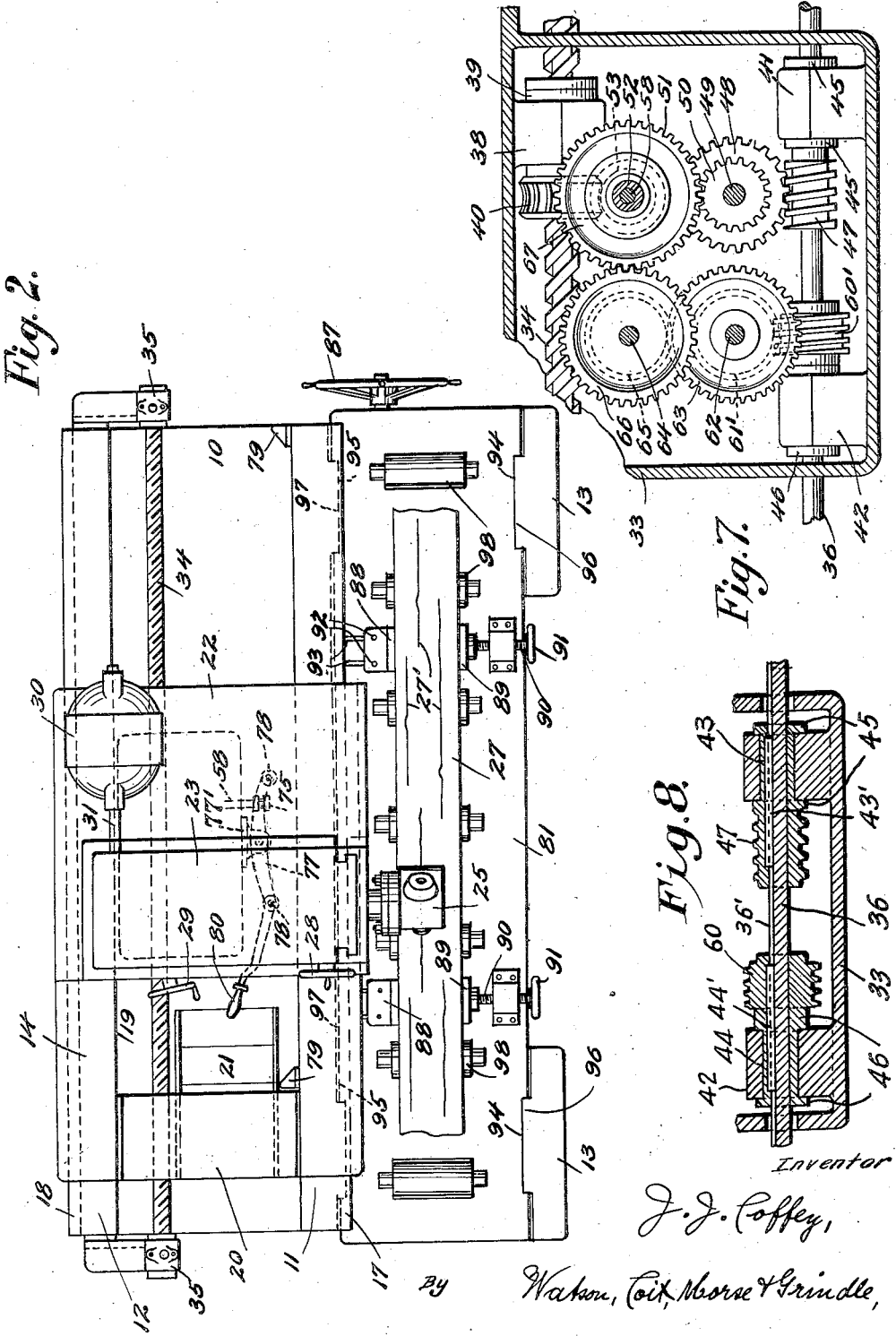

March 1, 1927.                J. J. COFFEY                1,619,057
                           MILLING MACHINE
                  Filed March 29, 1922    3 Sheets-Sheet 3
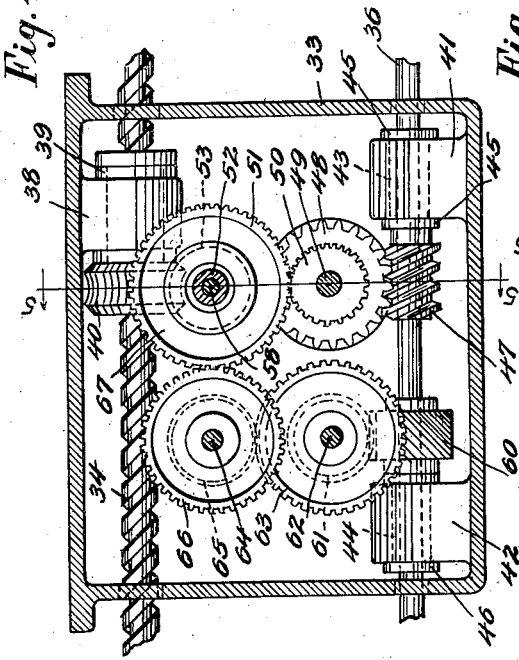
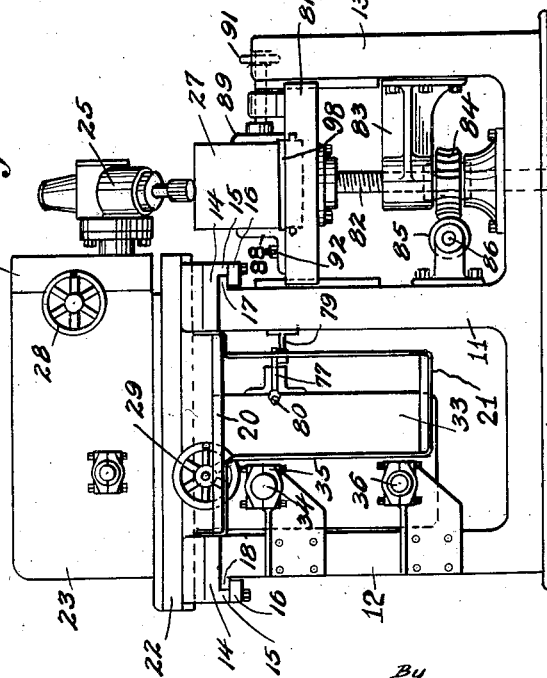
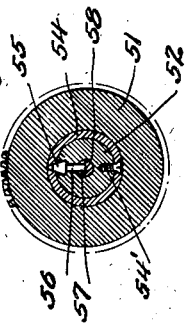
Inventor
J. J. Coffey,
By Watson, Coit, Morse & Grindle,
Att'ys Patented Mar. 1, 1927.

1,619,057

UNITED STATES PATENT OFFICE.

JOHN J. COFFEY, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

MILLING MACHINE.

Application filed March 29, 1922. Serial No. 547,790.

The present invention relates to milling machines.

In my co-pending application, Serial No. 420,707, filed October 30, 1920, is described a method of removing the surface defects such as seams, spots and blotches from the outer surfaces of ingots, billets, and other semi-finished products of a rolling mill. Prior to the invention of this method such work had been done by hand and was very costly as well as involving great delay. In accordance with the improved method a power driven milling cutter is employed to remove the surface defects and a great saving in time and in labor effected.

The present invention has for its object the provision of a machine especially designed and constructed to carry out the method above outlined.

As the work usually acted upon is relatively long and narrow, and as it is necessary for the milling cutter to have access to all parts of the outer surface, it is an important consideration to have the machine so designed and constructed that the cutter and the work may move relatively through a sufficient distance without causing the machine to occupy a too great floor area. This I accomplish by having a stationary work table and a movable support for the cutter, and it will be readily seen that in this case the machine need only be slightly longer than the work upon which it acts and that it has no sliding work supporting table which, in some instances, doubles the required amount of floor space necessary.

In removing the seams, spots, etc. by the use of a power driven milling cutter it is necessary to vary the direction, width and depth constantly as the cutter moves along the work, due to the irregularities of the defects to be removed. Constant observation and adjustment of the cutting tool relatively to the work by an attendant is, therefore, necessary, and the machine is so designed that its operator may be seated upon a portion which travels with the cutter and from which seat he can at all times clearly observe the action of the tool and may adjust the same by control wheels arranged before him.

A novel form of reversing mechanism for changing the direction of travel of the cutting element is also provided, this mechanism being semi-automatic in its operation. It is automatic in so far as stopping is concerned, the movement of the cutter supporting carriage being automatically halted as it reaches the end of the machine. A lever must, however, be operated by the attendant to reverse the mechanism. A novel form of work supporting table is disclosed and also novel means for driving the cutter supporting carriage along the bed relatively to the work, this means including gearing whereby the cutter may be given either one of two speeds in the same direction, or one speed in one direction and a different speed in the opposite direction, depending on the arrangement of the gearing.

Other novel features of the invention will be apparent to those skilled in the art as it is disclosed, and further advantages to be derived from its use. In the accompanying drawings:

Figure 1 is a front elevation of the milling machine and its driving motor;

Figure 2 is a top plan view of the same the motor being omitted;

Figure 3 is an end view of the machine;

Figure 4 is a vertical section through the change speed gear box, taken on a line parallel to the drive shaft;

Figure 5 is a section on line 5—5, Figure 4;

Figure 6 is a section on line 6—6 of Figure 5;

Figure 7 is a section similar to Figure 4 but showing a different arrangement of gearing, and, Figure 8 is a detail sectional view of the drive shaft and its associated gear elements.

The bed of the machine is indicated at 10 and extending upwardly therefrom are parallel spaced pedestals 11 and 12 which extend from end to end of the bed and the upper surfaces of which are coplanar and constitute trackways for the tool carriage slidably mounted thereon. Also extending upwardly from the bed and spaced from and parallel to the pedestals 11 and 12 are pedestals 13, 13 these pedestals being located however at the ends of the machine only. They are provided to cooperate with pedestal 11 in guiding and laterally supporting the horizontal work carrying table.

The movable tool carriage comprises essentially a rectangular base plate 14 the sides of which rest upon the upper surfaces of the pedestals 11 and 12 and which is provided with downwardly projecting longitudinally extending flanges 15. To these flanges are secured plates 16, which extend under the flanges 17 and 18 projecting horizontally outward from the tops of the pedestals 11 and 12 respectively. The plate 14 is slidable longitudinally on the trackways provided by the pedestals 11 and 12, but cannot be lifted accidentally from these pedestals or moved transversely of the machine due to the cooperation of the flanges 15 and plates 16 of the carriage base plate with the flanges 17 and 18 of the pedestals. Base plate 14 is cut away at 19 and an operator's seat 20 is suspended between its two parallel side portions. A foot rest or stand 21 is also hung from this plate, and in the operation of the device the attendant or operator may either stand on the foot rest or be seated on the seat 20 and will, in either position, be able to conveniently observe the workings of the machine and to conveniently control its movements.

Supported on base plate 14 and having a dovetailed engagement therewith is a transversely slidable plate or carriage 22 upon the upper surface of which a pedestal or casing 23 is positioned. This casing in turn slidably supports for movement in a vertical plane parallel to the longitudinal axis of the machine, a slide 24 on which the cutter head 25 is mounted, this cutter head being rotatable about a horizontal axis transverse to the machine so that the milling cutter 26 secured therein may be adjusted to different angles of inclination with the work, which in the drawings is indicated at 27 and constitutes a billet.

A hand wheel 28 is provided for operating any well known mechanism to effect the vertical adjustment of slide 24 and a second hand wheel 29 may be operated to effect the horizontal adjustment of the plate 22, and hence of the pedestal 23 and of the milling cutter. As the operator sits on seat 20 these handles are conveniently before him and he may also observe from this position, the relationship existing between the milling cutter 26 and the billet 27 and may quickly move the cutter transversely of the work or vertically relative thereto as desired or found necessary. Mounted upon the plate 22 is a motor 30 which is of the reversible variable speed type and may be conveniently controlled by a switch mechanism within reach of the operator, but which is not illustrated. This motor is connected by its shaft 31 with the milling cutter 26 through mechanism (not illustrated) of any suitable type, the milling cutter being however never disconnected from the motor 30 merely because of the vertical movement of the slide 24.

Hung from the longitudinally movable base plate 14 is a gear box 33 through which extends a threaded rod 34 which is rigidly and non-rotatably supported in brackets 35 and disposed longitudinally of the machine, and the rotatable drive shaft 36. This drive shaft 36 is parallel to shaft 34 and has one end connected to an electric motor 37 of the reversible variable speed type the operation of which is also controlled by the operator from his seat by a switch mechanism not illustrated. Rotatably secured within the bracket 38 integral with the casing 33 is a sleeve 39 which is internally threaded to receive the rod 34 and which has rigidly secured to one end a worm wheel 40. Rotation of sleeve 39 effects relative movement between this member and rod 34 and hence longitudinal movement of the tool carriage along the frame of the machine, and the direction of this movement of the carriage depends upon the direction in which sleeve 39 is rotated. This sleeve is operatively connected to the drive shaft 36 by mechanism now to be described.

The threaded sleeve 39 is driven through the intermediary of change speed gearing, as shown in Figure 4, or through the intermediary of reversing gearing, as shown in Figure 7. In either case, the drive shaft 36 is connected to the driving motor 37; however, in order to obtain reversal of the carriage with the change speed gearing, as both trains drive in the same direction, it is necessary that the motor 37 shall be reversible. The same gearing is employed in Figures 4 and 7, as will be apparent from a consideration of Figure 5, with the exception that the worm or spiral gears at the left hand side and driven by the shaft 36 are inclined in opposite directions. In Figure 4, the gearing gives two speeds in the same direction, while that in Figure 7 gives reverse movement.

Referring first to the arrangement of gearing for traversing the carriage in the same direction at different speeds, in Figure 4, I show the driving shaft 36 passing through brackets 41 and 42 within the casing 33, the brackets rotatably supporting therein the sleeves 43 and 44, respectively, having headed ends 45 and 46 to prevent longitudinal displacement of such sleeves with respect to the casing. Referring to Figure 8, it will be seen that the shaft 36 is provided with a longitudinal groove 36' and that the sleeves 43 and 44 are connected, respectively, by spline keys 43' and 44', which fit the groove 36', to the shaft 36.

Upon reference to Figures 4 and 7, it will be seen that the sleeve 43 is provided with a right hand worm 47 meshing with a worm wheel 48, the worm wheel 48 keyed to the transverse shaft 49 which is free to turn in bearings provided by the casing. A pinion 50 is keyed to the shaft 49 and meshes with a gear 51 which may be clutched to the shaft 52, the shaft having connected thereto a worm 53 which engages the worm 40 of the screw sleeve 39. This train of gearing is common to either type of transmission as illustrated in Figures 4 and 7. Assuming that the shaft 36 rotates in a clockwise direction viewed from the right of Figure 4, the worm gear 48 and the pinion 50 will be rotated in a counter-clockwise direction, the gear 51 will be rotated in a clockwise direction, and the worm 53 will also be rotated in a clockwise direction.

In Figure 4, the sleeve 44 has connected thereto a spiral gear 60 which engages the spiral gear 61 fixed to a transverse shaft 62, the latter also carrying a gear 63, which meshes with a pinion 65 carried by the shaft 64 and rigidly connected to the gear 66. The latter gear meshes with the gear 67 which is mounted on the shaft 52 and adapted to be clutched thereto. When the gear 67 is clutched to the shaft 52 and the gear 51 is unclutched, and assuming that the shaft 36 rotates in a clockwise direction viewed from the right of Figure 4, and also assuming that the teeth of the gear 60 are of the left hand spiral type, the gear 63 will be rotated clockwise, the pinion 65 and the gear 66 will be rotated counter-clockwise, and the gear 67 of the worm 53 will be rotated clockwise, as before. As the speed ratio of the train of gearing between the spiral gear 60 and the worm 53 is different from that between the worm 47 and the worm 53, it will be apparent that, with the arrangement of gearing shown in Figure 4, I have provided mechanism for traversing the carriage at different speeds in the same direction, reversal of the carriage being obtained by a reversal of the motor 37. In order that the change speed gearing shown in Figure 4 may be changed into reversible gearing, it is merely necessary to substitute a right hand spiral gear 60', as shown in Figure 7, for the left hand spiral gear 60, as shown in Figure 4, and to substitute a properly mating gear 61' for the gear 61.

In order that the worm 53 may be driven at different speeds in the same direction, as in Figure 4, or in reverse directions, as in Figure 7, the driven gear elements 51 and 67 of the two trains are arranged to be selectively clutched to the shaft 52. For this purpose, I show each of the gear elements 51 and 67 provided with sockets to receive clutch rings 54 and 68, respectively, which are slit and have the opposing ends chamfered to be acted upon by wedge elements 55 and 69. The rings are secured in place with respect to the shaft 52, by screws 54' and 68'. The wedge elements 55 and 69 are provided with shanks 56 and 70 arranged to extend within the hollow of the shaft 52 and to fit a slot or cut away portion 57 having ends inclined in opposite directions, said slot being provided in the actuating rod 58 extending beyond one end of the shaft 52. As the rod 58 is moved toward the right in Fig. 5, the wedge element 55 will be moved outwardly to clutch the gear 51 to the shaft 52. If such rod is moved toward the left from the position shown in Figure 5, the right hand inclined end of the slot 57 will act on the shank 70 of the wedge 69 to urge the latter outwardly to clutch the gear 67 to the shaft 52. In the position shown in Figure 5, both clutches are disengaged and it will be obvious that, if one gear is clutched to the shaft and it is desired to clutch the other gear thereto, in so doing, the first clutched gear will be unclutched before the desired gear is clutched.

The shift rod 58 is actuated either by automatic or semi-automatic means as will be clear from a consideration of Figure 2. To this end, I show a lever 77 fulcrumed at 77' and having a pin 76 which engages between collars 75 and 75' on the protruding end of the rod 58. The lever 77 is provided with rollers 78 substantially equi-distantly spaced from the fulcrum 77' and these rollers are arranged to engage inclined wedge members 79 at the ends of the frame in order that the lever 77 may be tilted to actuate the rod 58 in opposite directions. In Figure 2, assuming that the carriage moves toward the left, the rollers 78 at the left hand end of the lever 77 will engage the left wedge 79 to pull the shift rod 58 outward from the gear case, thereby either releasing the gear 51 or releasing such gear and clutching the gear 67 to the shaft 52 as will be described.

If the two-speed gearing is used, it is desirable that the transmission shall be automatically disconnected when the carriage reaches either end of its travel. Accordingly, therefore, if the form of gearing shown in Figure 4 is incorporated in the machine, engagement of the wedge element 79 with the roller 78 is arranged to impart only sufficient tilting motion to the lever 77 to move the shift rod from a position in which one of the gears, 51 or 67, is clutched to the shaft 52 to a neutral position in which both gears 51 and 67 are unclutched. Having unclutched a gear automatically, if it is desired to clutch the other gear, the lever 77 is shifted manually. To this end, therefore, I show a handle 80 connected to the lever 77 and accessible from the operator's seat 20 or stand 21. Since the type of transmission shown in Figure 4 is capable of driving only in one direction it is necessary, in order to reverse the motion of the carriage 22, to provide a reversible motor 37; and, such a motor would, of course, be provided with controlling circuits having switches accessible to the operator, and which, for the purposes of the present invention, are unnecessary to illustrate.

The two-speed type of transmission shown in Figure 4 has two desirable capabilities. First, such a transmission provides for a slow feed and a quick return motion, in which case the lever 77 is automatically tripped at the ends of the carriage travel to throw either engaged clutch into neutral position, whereupon the operator reverses the motor 37 and moves the handle 80 to engage one of the clutches. Secondly, with this type of transmission the carriage of course may be moved in either direction at two speeds as may be required by the character of material worked upon.

If the reversible type of transmission, shown in Figure 7, is incorporated in the machine, the lever 77 is arranged to have a throw sufficient to disengage one clutch and to engage the other clutch. This provides for automatic and continuous reversal of the carriage. Assuming that the carriage has moved so as to engage one of the rollers 78 with one of the wedges 79, the clutched gear forming an element of the train responsible for such movement is unclutched and the gear of the other train is clutched to the shaft 52, whereupon the carriage moves in the other direction and the gears are unclutched and clutched in reverse order. Such operation continues until the circuit of the motor is opened.

The work table on which the billet 27 or other article is supported is indicated at 81 and is supported for vertical adjustment upon threaded rods 82 which extend downwardly through brackets 83 secured to pedestals 13, and through internally threaded worm wheels 84 which are held against vertical movement by brackets 83 and annular pedestals mounted on the bed. These worm wheels 84 mesh with worms 85 on shaft 86 which extends longitudinally of the machine and is provided at one end with a hand wheel 87, by means of which it may be rotated to effect the rotation of worm wheels 84 and the vertical adjustment of work supporting table 81. Table 81 is cut away at 94, 94 and 95, 95 to receive guides 96, 96 and 97, 97 respectively comprising portions of pedestals 13 and 11, the arrangement being such that the table may be freely moved in a vertical direction, but is immovable horizontally either in a longitudinal or a transverse direction. Rotatably mounted upon the upper surfaces of the work table are a number of rollers 98 which carry the billet or similar article 27 and which enable the same to be easily moved into position, or to be removed from the table. The work is clamped between brackets 88 secured to the table top, and clamping blocks 89 adapted to be forced towards the brackets 88 by threaded rods 90 to which hand wheels 91 are secured. The bolts 92 which secure brackets 88 to the table top extend into T-slots 93 so that lateral adjustment of these brackets may be effected.

In the operation of the device an article, such as a billet 27, is rigidly secured in the position illustrated in Figures 1, 2 and 3. Imperfections in the surface of the billet are indicated by the lines 27' these imperfections usually being in the form of longitudinal seams. The seams may vary in direction, depth and width and it is necessary therefore for the operator from his seat to constantly observe the cutter and to manipulate the adjusting wheels to vary the depth and direction of cut almost constantly. The arrangement described enables a single operator to perform these functions with great ease and the machine is such that it occupies a minimum of floor space. The tool carriage may be automatically reversed or semi-automatically operated as desired. To one skilled in the art, the advantages of employing the present invention will be apparent and it will also be realized that the scope of the invention is not limited to the exact form of milling machine described and illustrated but that the principle of the invention may be embodied in a number of different forms.

Having thus described my invention what I claim as new and desire to secure by Letters Patent is:

1. A milling machine comprising in combination, a stationary bed, a tool carriage movable longitudinally thereon and means for moving said tool carriage, including a non-rotatable threaded rod extending longitudinally of the bed, an internally threaded sleeve having threaded engagement with the rod and rotatably secured to the tool carriage, a rotatable shaft arranged parallel to said non-rotatable threaded rod, a motor for rotating said shaft, and change speed gearing movable with the tool carriage and operatively connecting the rotatable shaft and said rotatable sleeve.

2. A milling machine comprising in combination, a stationary bed, a tool carriage movable longitudinally thereon and means for moving said tool carriage, including a non-rotatable threaded rod extending longitudinally of the bed, an internally threaded sleeve having threaded engagement with the rod and rotatably secured to the tool carriage, a rotatable shaft arranged parallel to said non-rotatable threaded rod, a motor for rotating said shaft, two separate means for connecting the rotatable shaft and the sleeve, and clutch mechanism for bringing either of said means into operation to effect the rotation of said sleeve.

3. A milling machine comprising in combination, a stationary bed, a tool carriage movable longitudinally thereon and means for moving said tool carriage, including a non-rotatable threaded rod extending longitudinally of the bed, an internally threaded sleeve having threaded engagement with the rod and rotatably secured to the tool carriage, a rotatable shaft arranged parallel to said non-rotatable threaded rod, a motor for rotating said shaft, two separate means for connecting the rotatable shaft and the sleeve, and clutch mechanism for bringing either of said means into operation to effect the rotation of said sleeve and to simultaneously disengage the other connecting means.

4. A milling machine comprising in combination, a stationary bed, a tool carriage movable longitudinally thereon and means for moving said tool carriage, including a non-rotatable threaded rod extending longitudinally of the bed, an internally threaded sleeve having threaded engagement with the rod and rotatably secured to the tool carriage, a rotatable shaft arranged parallel to said non-rotatable threaded rod, two independent gear trains for connecting the rotatable shaft and the sleeve, and clutch means for rendering either of said trains operative to drive the sleeve from the rotatable shaft.

5. A milling machine comprising in combination, a stationary bed, a tool carriage movable longitudinally thereon and means for moving said tool carriage, including a non-rotatable threaded rod extending longitudinally of the bed, an internally threaded sleeve having threaded engagement with the rod and rotatably secured to the tool carriage, a rotatable shaft arranged parallel to said non-rotatable threaded rod, two independent gear trains for connecting the rotatable shaft and sleeve, and a clutch device associated with each of said trains whereby it may be rendered effective or ineffective as desired, to connect the rotatable shaft and the sleeve.

6. A milling machine comprising in combination, a stationary bed, a tool carriage movable longitudinally thereon, and means for moving said tool carriage including a motor, a rotatable shaft driven by the motor, a stationary shaft, a rotatable member carried by the tool carriage and operatively engaging the stationary shaft, gearing connecting the rotatable shaft and rotatable member, a clutch for rendering said connection operative or inoperative as desired, and means for automatically operating the clutch when the tool carriage reaches the end of its travel.

7. A milling machine comprising in combination, a stationary bed, a tool carriage movable longitudinally thereon, and means for moving said tool carriage including a motor, a rotatable shaft driven by the motor, a stationary shaft, a rotatable member carried by the tool carriage and operatively engaging the stationary shaft and two trains of gears connecting the rotatable shaft and rotatable member, the gearing in one train being changeable so that the two trains may be utilized in giving the tool carriage either two speeds in one direction or one speed in either direction.

8. A milling machine of the class described having a stationary bed, a stationary work holder, a travelling tool holder and an operator's seat movable with the tool holder, for the purpose set forth.

In testimony whereof I hereunto affix my signature.

JOHN J. COFFEY.